Dec. 31, 1929. T. K. A. NORDENSSON 1,741,731
COMPRESSOR DRIVEN BY INTERNAL COMBUSTION ENGINES
Filed Aug. 16, 1926  2 Sheets-Sheet 1

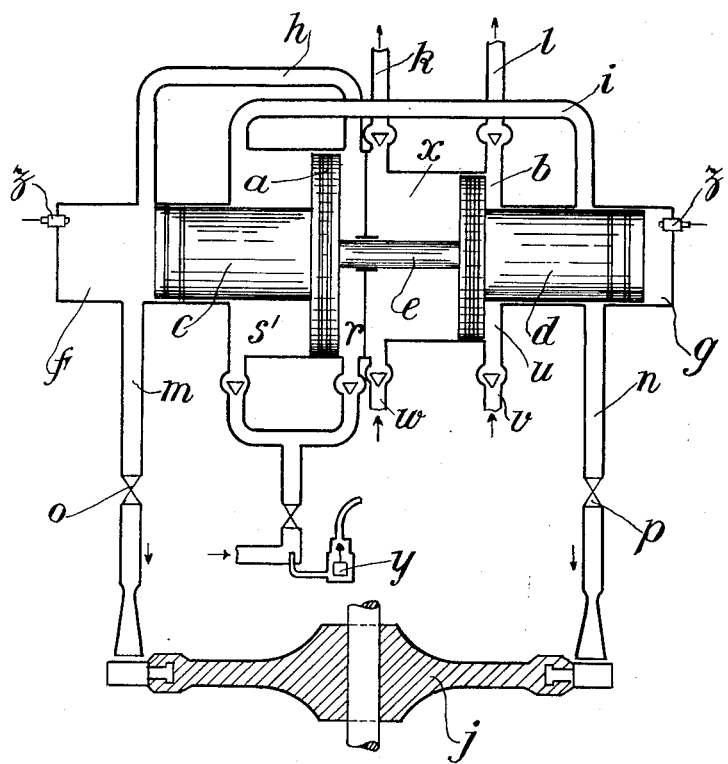

Patented Dec. 31, 1929

1,741,731

UNITED STATES PATENT OFFICE

TOM KNUT ARFVED NORDENSSON, OF GLASGOW, SCOTLAND

COMPRESSOR DRIVEN BY INTERNAL-COMBUSTION ENGINES

Application filed August 16, 1926, Serial No. 129,607, and in Germany August 19, 1925.

The present invention refers to compressors of the type which are driven by an internal combustion engine without the use of any crank gear.

The main object of the invention is to provide an improved compressor of this type and to this end the compressor comprises two compression pistons connected with the piston or pistons of a double acting internal combustion engine so as to obtain a compression stroke of each compression cylinder for each stroke of said internal combustion engine, said compression pistons operating in separate cylinders, one compression piston serving for compression of air or a gaseous mixture for combustion whereas the other piston serves for compression of air or of another gas or vapour to be utilized for other purposes.

The exhaust gases from both combustion spaces of the internal combustion engine may be used for driving a single turbine or other expansion engine.

Referring to the drawings:—

Fig. 2 is a modification of the embodiment shown in Fig. 1.

Figure 1:
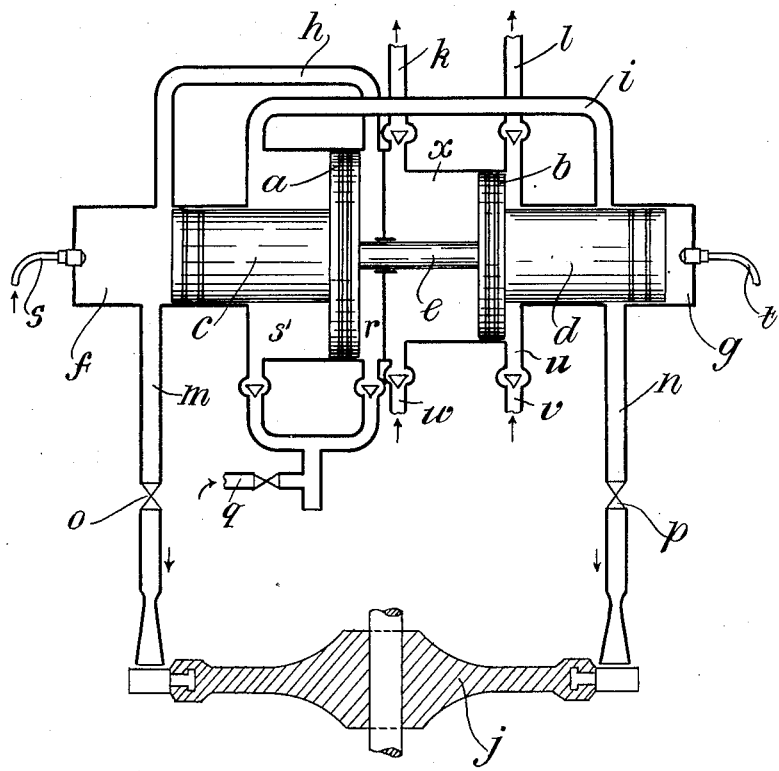
Fig. 1 is one embodiment of this invention.

In the construction shown in Fig. 1, $a$ and $b$ are two pistons of a compressor, said pistons being directly connected to the pistons $c$ and $d$ of an internal combustion engine. The compressor pistons $a$ and $b$ are interconnected by an intermediate member $e$. The combustion and expansion chambers of the engine are marked $f$ and $g$. The engine operates as a two stroke cycle engine, the expansion taking place in the one cylinder of the engine, for instance in $f$, when the mixture of gas and air is compressed in the other cylinder $g$. The two cylinders of the engine are connected with the compressor chambers $r$ and $s'$ by means of conduits $h$ and $i$, the compressor delivering the air for combustion to ports in the cylinder which are covered and uncovered by the pistons so that these pistons act to control the supply of gas to the cylinders. The machine disclosed in the drawing is provided with a turbine wheel $j$, which is driven by the exhaust gases of the engine. The compressor chambers $u$ and $x$ deliver compressed air also for other purposes, which air escapes through the conduits $k$, $l$. Such compressed air is, consequently, independent of the quantity of air compressed by the piston and serving to feed the engine. The conduits $m$, $n$ convey the exhaust gases from the cylinder of the engine to the turbine wheel $j$. The internal combustion engine is provided with sprayer nozzles $s$ and $t$ for atomization of the fuel in the combustion chamber.

In operation, commencing with the parts in the position shown in Fig. 1, an explosion is taking place in cylinder $g$ which moves the piston $d$ to the left and this causes the piston $a$ to compress the air in chamber $s'$ and to draw fresh air into chamber $r$ through the inlet $q$; escape of gas from chamber $s'$ through conduit $i$ being prevented by the piston $d$ closing the outlet thereof until the piston has reached the end of its stroke. As the piston $d$ moves it first uncovers a port leading to the exhaust pipe $n$ through which the products of combustion are discharged, so that thereafter the piston $d$ uncovers a port communicating with the conduit $i$ and allows the air to sweep into the cylinder to effectively scavenge it and supply fresh air for the next compression stroke. At the same time, the piston $c$ has ben moved to compress the air in the cylinder $f$. Fuel is sprayed into the cylinder $f$ by the sprayer nozzle $s$ and the compression causes it to self-ignite, giving a power impulse in the opposite direction to the piston $c$ and the parts connected therewith. On this second stroke the piston $a$ draws a fresh supply of air into the chamber $s'$ through the inlet $q$ and compresses the air drawn into the chamber $r$ at the preceding stroke; the escape of gas through the conduit $h$ being prevented by piston $c$ until the latter has reached the end of its stroke. As the piston $c$ moves it first uncovers a port leading to the exhaust pipe $n$ through which the products of combustion are discharged. Thereafter, the piston $c$ uncovers the port communicating with conduit $h$ so that the air compressed in the chamber $r$ rushes into the cylinder $f$ to scavenge it and supply fresh air for the next compression stroke of the piston. Fuel is supplied to the cylinder $g$ by the sprayer nozzle *t* and the cycle is then repeated. At each stroke the piston *b* forces air under pressure from the chambers *x* and *u* through the conduits *k* or *l*. At the first stroke the piston sucks air into the chamber *u* through inlet *v* and compresses and forces air from the chamber *x* through the conduit *k*, and at the second stroke it sucks air into the chamber *x* through inlet *w* and compresses and forces the air drawn into chamber *u* through conduit *l*.

Alternatively the engine may as shown in Fig. 2 be supplied with a combustible gaseous mixture, in which case the carburetter *y* indicated in the drawing used, and the gaseous mixture supplied by the carburetter is compressed in the compressor to be then supplied to the cylinders of the engine. In this case the engine is provided with spark plugs *z*.

It is not believed to be necessary to set out in extenso the cycle of the modification shown, as it is precisely the same as that of Fig. 1. In this latter case the sparking plugs may be dispensed with and the combustible gaseous mixture may be caused to self-ignite by producing a sufficiently high compression.

In the drawing, further conduits, shut off and regulating valves as well as non-return valves are shown, but it is not considered necessary to describe the operation and use thereof.

As previously pointed out, a compressor according to the invention entails the great advantage in relation to known compressors of this type, that a compression stroke is obtained for every stroke of the internal combustion engine, said compression being always effective, as it takes place in a space separated from the combustion spaces and, consequently independently thereof, said advantage being attained while maintaining all other advantages.

What I claim is:

1. A compressor comprising, in combination a double acting internal combustion engine; two separate compressor chambers, one serving for compression of a gas for combustion and the other serving for compression of gaseous matter for other purposes and two compression pistons, one in each of said chambers, said pistons being connected with the internal combustion engine so as to give a compression stroke in each compression chamber for each stroke of said internal combustion engine.

2. A compressor comprising, in combination, two opposed internal combustion motor cylinders, two inter-connected working pistons, one in each of said cylinders so arranged that every stroke is a power stroke, two separate compressor chambers, one serving for compression of a gas for combustion and the other serving for compression of gaseous matter for other purposes and two compression pistons, one in each of said chambers, said pistons being connected with the said working pistons so as to give a compression stroke in each compression chamber for each stroke of said internal combustion engine.

3. A compressor comprising in combination two opposed internal combustion motor cylinders, two separate compressor chambers between said combustion motor cylinders, one for compressing a gas for combustion and the other for compressing gaseous matter for other purposes, two working pistons one in each of said cylinders, two compression pistons, one in each of said compressor chambers and means directly connecting said working and compression pistons whereby each stroke being a power stroke gives a compression stroke in each compressor chamber.

4. In combination, two separate compressors, one for compressing a gas for combustion and the other for compressing gaseous mixture for other purposes, two opposed internal combustion motor cylinders co-axial with said compressors, working pistons in said cylinders and means directly connecting said working pistons together and to said compressors whereby each stroke of the inter-connected working pistons is a power stroke giving a compression in each compressor for each stroke.

In testimony whereof I affix my signature.
TOM KNUT ARFVED NORDENSSON.